United States Patent [19]

Quatrini et al.

[11] 3,857,929

[45] Dec. 31, 1974

[54] PROCESS FOR PRODUCING AMMONIUM METATUNGSTATE FROM AMMONIUM TUNGSTATE BY ION EXCHANGE

[75] Inventors: L. Rita Quatrini; Tai K. Kim; James C. Patton; Martin B. Macinnis, all of Towanda, Pa.

[73] Assignee: GTE Sylvania Incorporated, Stamford, Conn.

[22] Filed: Jan. 23, 1974

[21] Appl. No.: 435,977

[52] U.S. Cl............................. 423/593, 75/101 BE
[51] Int. Cl............................................ C01g 41/00
[58] Field of Search................... 423/54, 593, 606; 75/101 BE

[56] References Cited
UNITED STATES PATENTS

| | | | |
|---|---|---|---|
| 2,968,527 | 1/1961 | Baker | 423/54 |
| 3,175,881 | 3/1965 | Chiola et al. | 423/593 |
| 3,231,329 | 1/1966 | Weiss et al. | 423/54 |
| 3,451,764 | 6/1969 | MacWilliams et al. | 423/593 |
| 3,472,613 | 10/1969 | Hay et al. | 423/606 |
| 3,591,331 | 7/1971 | Chiola et al. | 423/606 |

OTHER PUBLICATIONS

Taylor, "Journal of American Chemical Soc.," Vol. 24, 1902, pp. 629–643.

Primary Examiner—Herbert T. Carter
Attorney, Agent, or Firm—Norman J. O'Malley; John C. Fox; Donald R. Castle

[57] ABSTRACT

A process for producing crystalline ammonium metatungstate (AMT) from ammonium tungstate (AT) solution by introducing a strong acid cation exchange resin containing sulphonic group batchwise into an AT solution until a pH of about 3.5 is reached. The resin is then removed by filtration and the filtered solution is digested at about 98°C for at least about 5 hours, followed by crystallization of AMT by conventional processes, such as, evaporation or spray drying.

7 Claims, No Drawings

3,857,929

PROCESS FOR PRODUCING AMMONIUM METATUNGSTATE FROM AMMONIUM TUNGSTATE BY ION EXCHANGE

BACKGROUND OF THE INVENTION

This invention relates to a process for producing ammonium metatungstate (AMT) directly from ammonium tungstate (AT) solution by cation exchange.

At present, both ammonium paratungstate (APT) and AMT are being used as tungsten sources in the catalyst industry. Since APT has a limited solubility in water (about 2–3 percent at room temperature), the user converts APT to a more soluble peroxytungstate form by means of hydrogen peroxide in order to prepare the catalyst. While AMT is highly water soluble, and thus need not be converted, it is in general more expensive than APT, due to the complexity and/or low yields of processes for producing it.

At the present time, crystalline AMT is being produced from APT by a process described in U.S. Pat. No. 3,175,881. Although this process overcomes some of the disadvantages of the prior art, in practice it is somewhat difficult to control for maximum conversion. As a consequence, on crystallization of AMT from solution, the residual APT must be removed in order to produce completely water-soluble AMT products. Another disadvantage of this process is its intermittent batch nature, requiring baking, digesting, filtering and concentrating of solutions before crystallization. On a production scale, such stepwise operations tend to be time consuming and costly.

As an improvement over the above process, a method for producing AMT directly from ammonium tungstate (AT) solution without an appreciable formation of APT is described in U.S. Pat. No. 3,591,331. In this process, AT solution is contacted with a liquid extraction system consisting of Di-2-ethyhexyl phosphoric acid (D-2-EHPA):tri-n-butyl phosphate (TBP:kerosene, which extracts ammonium ion and rapidly lowers the pH to the AMT-forming region. The solution is then digested to allow formation of AMT.

While this method substantially avoids the formation of APT and is amenable to continuous processing, it has not found widespread use due to the tendency toward instability of the organic solution and the resultant formation of insoluble phospho-tungstates in amounts of up to 10 percent or more of the total solid product, depending upon the conditions of formation.

SUMMARY OF THE INVENTION

In accordance with the invention, it has been discovered that contacting an ammonium tungstate solution having a pH above about 9 with a strong acid cation exchange resin containing sulphonic acid groups results in lowering of the pH of the solution to the AMT-forming region (pH of from about 4.5 to 3.0) without appreciable formation of APT, promoting formation of at least some metatungstate ions, and that subsequent digestion at a temperature of at least about 98°C for at least about 5 hours results in substantially complete conversion of AT solution to AMT solution which when crystallized yields solid AMT.

In accordance with another aspect of the invention, there is provided a stripping process whereby the resin is regenerated for reuse in the exchange process.

DETAILED DESCRIPTION OF THE PREFERRED EMBODIMENTS

For a better understanding of the present invention, together with other and further objects, advantages and capabilities thereof, reference is made to the following disclsoure and appended claims in connection with the above description of some of the aspects of the invention.

The strong acid cation exchange resin suitable for use herein may be any conventional strongly acidic cation exchange resin such as Duolite C-20 $Na^+$ resin, a polymeric stylene sulfonic acid crosslinked with divinyl benzene, having an ion exchange capacity of 2.1 (all ion exchange capacities are in milliequivalents per milliliter based on Na) (Diamond Shamrock Chemical Company), Amberlite IR-120 $Na^+$ resin, a polymeric stylene sulfonic acid crosslinked with 8 percent divinyl benzene, having an exchange capacity of 1.9 (Rohm and Haas Company), Illco C-211 $Na^+$ resin, a polymeric stylene sulfonic acid crosslinked with 8 percent divinyl benzene, having an exchange capacity of 2.0 (Illinois Water Treatment Company) or Dowex 50W-X8, a polymeric styrene sulfonic acid crosslinked with 8 percent divinyl benzene, having an exchange capacity of 2.0 (Dow Chemical Company).

The AT feed solution can be prepared by any of the previously known procedures, including the solvent extraction processing of tungsten values, the dissolution of tungstic acid in ammonium hydroxide, and the like.

The concentration of ammonium tungstate in the starting solution can vary from about less than 1 gram per liter to about 280 grams per liter, $WO_3$ basis. A solution of from about 130 to about 150 grams per liter, $WO_3$ basis, is preferred from a capacity and equipment investment viewpoint on the basis of cost per unit of tungsten processed. Such tungsten solutions will have pH ranging from about 9 to 11.

The resin is slowly added batchwise to the AT solution with continuous mixing until the pH of the solution has been lowered to between 4.5 and 3.0 and preferably between 3.5 and 3.0, resulting in formation of at least some metatungstate ions. Mixing should be continued for at least about 1 hour to insure that the pH is stabilized at the desired value. If sufficient resin is added to result in a pH below 3.0 of the solution, insoluble tungstic acid may form, contaminating both the resin and the supernatant liquid. After the pH has been stabilized, the resin is separated from the solution such as by filtration.

The filtered solution containing some metatungstate species must be digested at a temperature of at least about 98°C for at least about 5 hours, to obtain substantially complete conversion from AT to AMT solution.

Crystallization of AMT from solution may be carried out in the conventional manner, such as by evaporation or spray drying.

If, during stabilization or digestion the pH begins to drift above the desired value, additional resin may be added, and removed prior to the final crystallization step. The pH should not be permitted to drift above 4.5 and preferably not above 3.5, above which insoluble AT might form, contaminating the resin and solution.

When a pH within the desired range cannot be achieved as described above, the resin is ready for regeneration.

Regeneration of the resin may be carried out using a mineral acid, such as hydrochloric and sulfuric acid. A 5 to 10 percent by weight solution of hydrochloric acid is of sufficient strength for regneration.

To illustrate the invention in further detail, an example is presented.

EXAMPLE

Illco 211 resin is slowly added, batchwise, to 400 ml of ammonium tungstate solution containing 140 grams $WO_3/l$, until the pH reaches 3.5. The solution and resin are continually mixed for about one hour to insure that the pH is stabilized at 3.5. The resin is then removed by filtration and the solution is digested for 5 hours at 98°C, and evaporated to dryness to isolate the crystalline ammonium metatungstate product. To regenerate the resin, wash the resin with water, collect about 200 milliliters of the initial wash solution which may contain small amounts of tungsten, and use for diluting the initial ammonium tungstate solution. Continue washing the resin until the washing solution becomes almost neutral in pH. At this time, check the wash solution with Nessler's reagent. If it gives a negative test for ammonium ion, the resin is ready for regeneration. In order to regenerate the resin to hydrogen form, add 5 percent by weight of hydrochloric acid to the resin until the pH becomes strongly acidic.

While there has been shown and described what are at present considered the preferred embodiment of the invention it will be obvious to those skilled in the art that various changes and modifications may be made therein without departing from the scope of the invention as defined by the appended claims.

What is claimed is:

1. A process for producing crystalline ammonium metatungstate comprising:
    1. contacting an aqueous ammonium tungstate solution having a pH of at least 9 with a sulfonic acid cation exchange resin in an amount sufficient to extract ammonium ions from the aqueous solution and to lower the pH thereof to between about 4.5 and 3.0 to form at least some metatungstate ions;
    2. separating the aqueous solution containing the metatungstate ions from the resin;
    3. heating the aqueous solution at a temperature of at least about 98°C for at least about 5 hours; and
    4. crystallizing ammonium metatungstate from the aqeuous solution.
2. The process of claim 1 wherein sufficient resin is added to the aqueous solution containing metatungstate ions to lower the pH thereof to between about 3.5 and 3.0.
3. The process of claim 1 wherein the concentration of the aqueous ammonium tungstate solution is $280gWO_3/l$ to less than $1gWO_3/l$.
4. The process of claim 3 wherein the concentration of the aqueous ammonium tungstate solution is from 130 to 150 $gWO_3$/liter.
5. The process of claim 1 wherein the resin is regenerated for reuse by removing the ammonium ions therefrom.
6. The process of claim 5 wherein a mineral acid strip solution is used to remove the ammonium ions.
7. The process of claim 6 wherein the mineral acid is hydrochloric acid having a concentration of from about 5 to 10 percent by weight.

* * * * *